United States Patent
Liao et al.

(10) Patent No.: US 8,249,539 B2
(45) Date of Patent: Aug. 21, 2012

(54) DEVICE AND METHOD FOR DC OFFSET CANCELLATION

(75) Inventors: Che-Hung Liao, Hsinchu (TW); Wen-Kai Li, Hsinchu (TW)

(73) Assignee: Ralink Technology Corporation, Hsinchu (TW)

( * ) Notice: Subject to any disclaimer, the term of this patent is extended or adjusted under 35 U.S.C. 154(b) by 424 days.

(21) Appl. No.: 12/505,750

(22) Filed: Jul. 20, 2009

(65) Prior Publication Data

US 2010/0080324 A1 Apr. 1, 2010

(30) Foreign Application Priority Data

Oct. 1, 2008 (TW) ............................. 97137664 A

(51) Int. Cl.
*H04B 1/10* (2006.01)
(52) U.S. Cl. ......... 455/296; 455/307; 455/311; 455/312
(58) Field of Classification Search .................. 455/296, 455/302, 306, 307, 309, 310–312
See application file for complete search history.

(56) References Cited

U.S. PATENT DOCUMENTS

| | | | | |
|---|---|---|---|---|
| 6,442,380 | B1 * | 8/2002 | Mohindra ................... | 455/234.1 |
| 7,127,224 | B2 * | 10/2006 | Ichihara ..................... | 455/240.1 |
| 7,403,760 | B1 * | 7/2008 | Gao .............................. | 455/312 |
| 7,499,687 | B2 * | 3/2009 | Papathanasiou et al. .. | 455/250.1 |
| 7,499,692 | B2 * | 3/2009 | Nakamura et al. ............ | 455/296 |
| 2003/0156668 | A1 * | 8/2003 | Atkinson et al. .............. | 375/345 |
| 2003/0214423 | A1 * | 11/2003 | Lee et al. ...................... | 341/118 |
| 2004/0097212 | A1 * | 5/2004 | Matsumoto et al. .......... | 455/296 |
| 2004/0176055 | A1 * | 9/2004 | Vepsalainen et al. ......... | 455/130 |
| 2004/0217797 | A1 * | 11/2004 | Cao et al. ...................... | 327/307 |
| 2006/0246842 | A1 * | 11/2006 | Mohindra .................... | 455/63.1 |
| 2008/0089443 | A1 * | 4/2008 | Sanada et al. ................. | 375/319 |

* cited by examiner

*Primary Examiner* — Duc M Nguyen
(74) *Attorney, Agent, or Firm* — Peter F. Corless; Steven M. Jensen; Edwards Wildman Palmer LLP

(57) ABSTRACT

A device and method for DC offset cancellation device are disclosed. The method includes keeping a high pass module at off state, converting an analog radio frequency signal to a digital baseband signal by a direct down conversion receiving module, detecting a DC offset value during the conversion by an offset compensation module so as to provide an offset compensation signal corresponding to the DC offset value to the direct down conversion receiving module, and determining whether a control condition is reached by a control module so as to timely switch on the high pass module for canceling the residual DC offset in the direct down conversion receiving module. In the present invention, the offset compensation module provides preliminary offset compensation signals and then the high pass module accurately cancels residual DC offset, thereby significantly reducing the reaction time for DC offset cancellation.

20 Claims, 9 Drawing Sheets

DEVICE AND METHOD FOR DC OFFSET CANCELLATION

BACKGROUND OF THE INVENTION

1. Field of the Invention

The present invention relates generally to a device and method for DC offset cancellation, and more particularly to a DC offset cancellation device and method used in direct down conversion receivers.

2. Description of Related Art

Direct down conversion receivers are generally applied in wireless communications for preamble processing such as receiving a wireless radio frequency signal, converting, amplifying and filtering the wireless radio frequency signal so as to obtain corresponding digital baseband signal which is further provided to a next stage circuit.

However, during the conversion of the analog signal to the digital signal, DC offset often occurs due to the following reasons: (1) transistors in the signal path do not entirely match; (2) signal leakage occurs to the local oscillators and thus produces DC offset; and (3) reflected signal is received again by the antenna and produces DC offset.

When the signal in a direct down conversion receiver has DC offset, digital baseband signal produced in the direct down conversion receiver is distorted. The amplifiers or filters in the direct down conversion receivers may be saturated due to the DC offset, thus adversely affecting normal operation of the direct down conversion receiver. Therefore, it is important to provide a DC offset correction mechanism or DC offset cancellation mechanism for wireless receivers.

FIG. 1a shows a basic structure of a direct down conversion receiver. The direct down conversion receiver 10 comprises: a mixer 11, a gain amplifier 12, a filter 13 and an analog-to-digital converter 14. During operation, the mixer 11 receives a radio frequency signal and a local oscillation signal to produce a baseband signal, and then the baseband signal is amplified and filtered, and converted to digital baseband signal through the analog-to-digital converter 14.

FIGS. 1b and 1c show a first DC offset correction structure and a second DC offset correction structure in the prior art, respectively.

As shown in FIG. 1b, a variable high pass module 15 is connected between the amplifier 12 and the filter 13 in series to cancel DC offset in the direct down conversion receiver.

Alternatively, as shown in FIG. 1c, a high pass feedback loop having similar effect is provided to cancel DC offset in the direct down conversion receiver.

However, the above-described two techniques have long reaction time; in other words, it requires long reaction time to completely cancel DC offset, which accordingly cannot meet the demand for high communication efficiency of current communication devices.

Therefore, it is in urgent need to provide a DC offset correction technique with short reaction time and high correction efficiency.

SUMMARY OF THE INVENTION

According to the above drawbacks, the present invention provides a device and method for DC offset cancellation with short reaction time and high correction efficiency.

The present invention provides a DC offset cancellation device, which comprises: a direct down conversion receiving module for receiving an analog radio frequency signal and converting the analog radio frequency signal to a digital baseband signal; an offset compensation module for detecting DC offset value during conversion of the analog radio frequency signal to the digital baseband signal and providing an offset compensation signal corresponding to the DC offset value to the direct down conversion receiving module; a high pass module for canceling DC offset in the direct down conversion receiving module; and a control module for setting a control condition and switching the state of the high pass module according to the control condition.

Further, the direct down conversion receiving module comprises a local oscillation signal source, a mixing unit, an amplifying unit, a filtering unit and an analog-to-digital conversion unit, wherein the offset compensation signal compensates the amplifying unit.

The mixing unit receives and mixes the analog radio frequency signal and the local oscillation signal from the local oscillation signal sources to produce a baseband signal; the amplifying unit receives and amplifies the baseband signal to produce an amplified baseband signal; the filtering unit receives the amplified baseband signal and filters the amplified baseband signal to produce a filtered baseband signal; the analog-to-digital conversion unit converts the filtered baseband signal to a digital baseband signal.

The direct down conversion receiving module further comprises a post stage amplifying unit for amplifying the filtered baseband signal. The post stage amplifying unit also receives the offset compensation signal for DC offset cancellation.

The DC offset cancellation device further comprises a radio frequency signal receiving module with a receiving antenna for receiving a wireless radio frequency signal and converting the wireless radio frequency signal to the analog radio frequency signal. The radio frequency signal receiving module further comprises a pre stage amplifier for amplifying the analog radio frequency signal.

The offset compensation module further comprises an offset compensation data unit for storing and providing a plurality of groups of offset compensation signal data. After the offset compensation module detects a DC offset value, the offset compensation module compares the DC offset value with the plurality of groups of offset compensation signal data so as to produce an offset compensation signal corresponding to the DC offset value and provide the offset compensation signal to the direct down conversion receiving module.

It should be noted that the offset compensation signal produced by the offset compensation module is generally digital offset compensation signal and the signal of the direct down conversion receiving module is generally analog. Therefore, preferably, the offset compensation module further comprises a digital-to-analog conversion unit for converting the digital offset compensation signal to analog offset compensation signal which is further provided to the direct down conversion receiving module for offset compensation.

The high pass module can be serially connected between the mixing unit and the amplifying unit. Alternatively, the high pass module can be a loop type high pass module.

When the series-connected high pass module is off, a signal from the mixing unit is transmitted, e.g. directly, to the amplifying unit without passing through the high pass module. On the other hand, when the high pass module is on, a signal from the mixing unit passes through the high pass module for canceling the DC offset error in the signal before being transmitted to the amplifying unit.

When the loop type high pass module is off, it does not produce a feedback signal. On the other hand, when the loop type high pass module is on, it produces a feedback signal to compensate the amplifying unit, thereby canceling the DC offset error in the signal.

Further, the high pass module can be a variable high pass module with its corner frequency variable between higher high pass frequency and lower high pass frequency. In order to reduce the reaction time for entire DC filtering, the high pass module first switches to a higher high pass frequency to filter most of DC offset within a short period of time at the expense of some signal bandwidth and then switches to a lower high pass frequency for filtering the residual DC offset.

It should be noted that the type of the control condition set by the control module can be arbitrarily selected. However, since time is an important parameter in the wireless radio frequency system and operation time of the preamble process is limited, preferably, switching period is used as the control condition for determining the time point for switching the state of the high pass module.

Therefore, the control module further comprises a time unit for setting and calculating the switching period so as to determine the time point for switching the state of the high pass module.

In addition, the present invention further provides a DC offset cancellation method, which comprises the steps of providing a high pass module and a direct down conversion receiving module; keeping the high pass module at off state, making the direct down conversion receiving module receive an analog radio frequency signal and converting the analog radio frequency signal to a digital baseband signal; (3) detecting DC offset value during conversion of the analog radio frequency signal to the digital baseband signal and providing an offset compensation signal corresponding to the DC offset value to the direct down conversion receiving module; and (4) determining whether a control condition is reached, if yes, the high pass module is switched on, otherwise, the high pass module is kept at off state and step (4) is repeated.

Therein, step (2) further comprises the steps of: mixing the analog radio frequency signal and the local oscillation signal to form a baseband signal; amplifying the baseband signal to form an amplified baseband signal; filtering the amplified baseband signal to form a filtered baseband signal; and converting the filtered baseband signal to the digital baseband signal.

Step (3) further comprises the steps of: detecting DC offset value during conversion of the analog radio frequency signal to the digital baseband signal; comparing the DC offset value with offset compensation data to select an offset compensation signal corresponding to the DC offset value; and providing the offset compensation signal to the direct down conversion receiving module.

In the case the high pass module is a variable high pass module, step (5) is performed after step (4), wherein the high pass module is kept at higher high pass frequency so as to cancel main offset in residual DC offset, and then the high pass module is set to lower high pass frequency so as to further cancel the residual DC offset.

Therefore, the present invention first keeps the high pass module at off state and converts analog radio frequency signal to digital baseband signal through the direct down conversion receiving module, and then detects DC offset value during the conversion process through the offset compensation module so as to provide an offset compensation signal corresponding to the DC offset value to the direct down conversion receiving module. Thereafter, the control module determines whether the control condition is reached so as to timely switch on the high pass module to cancel the residual DC offset error in the direct down conversion receiving module.

Therefore, the present invention provides a preliminary compensation signal through an offset compensation module, and then accurately cancels the residual DC offset through the high pass module, thereby greatly reducing the reaction time in the DC offset cancellation without adversely affecting the degree of precision.

DETAILED DESCRIPTION OF PREFERRED EMBODIMENTS

The following illustrative embodiments are provided to illustrate the disclosure of the present invention, these and other advantages and effects can be apparent to those skilled in the art after reading the disclosure of this specification.

Figure 1A:
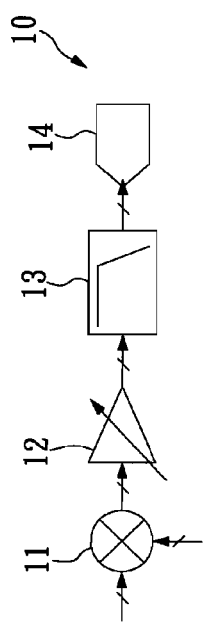
FIG. 1a is a diagram showing a basic structure of a direct down conversion receiver.
Figure 1B:
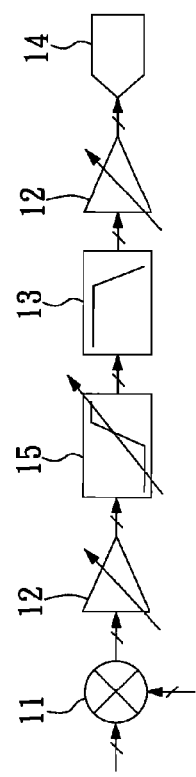
FIG. 1b is a diagram showing a first structure for DC offset correction in the prior art.
Figure 1C:
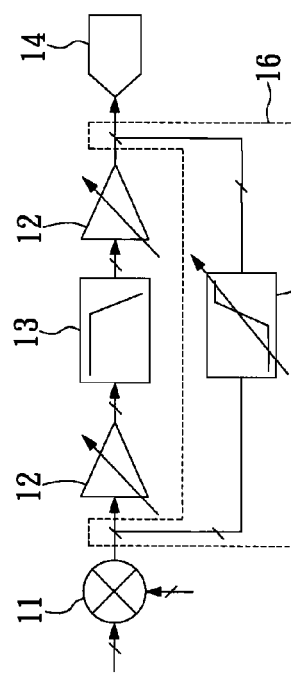
FIG. 1c is a diagram showing a second structure for DC offset correction in the prior art.
Figure 2A:
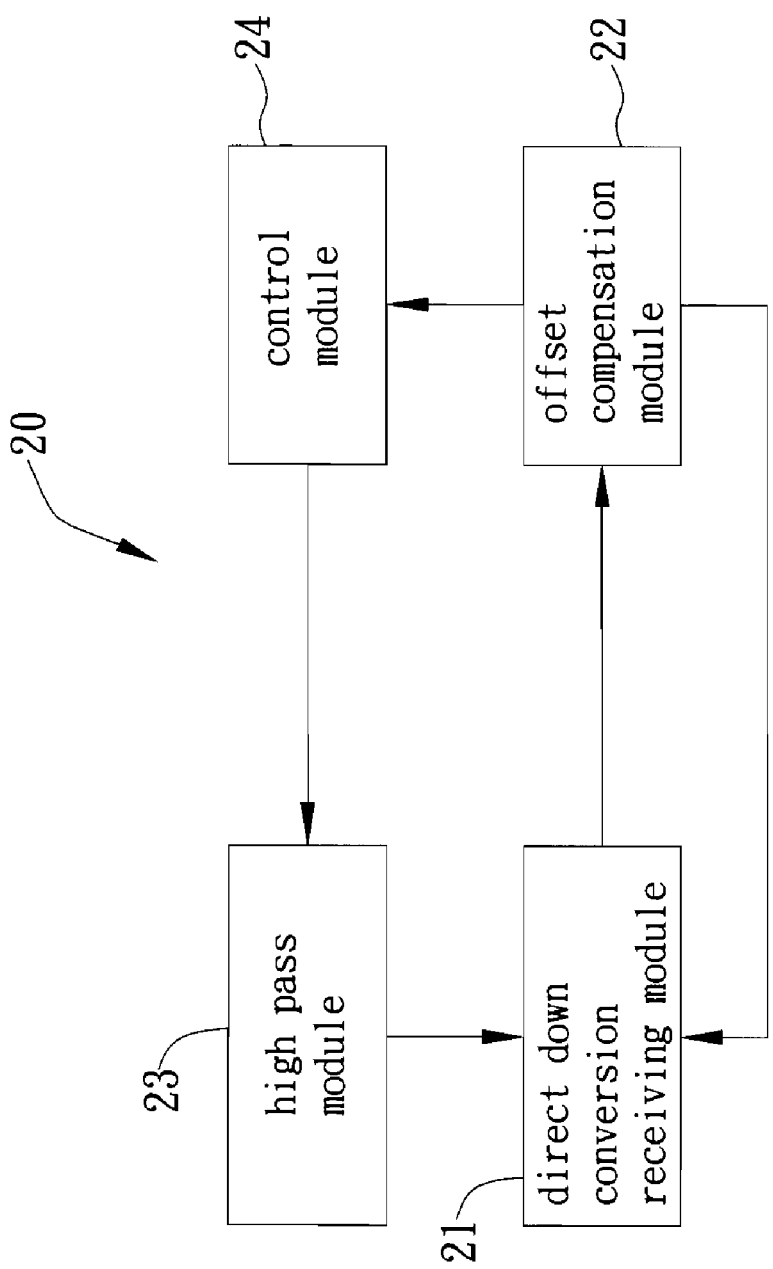
FIG. 2a is a diagram showing a basic structure of a DC offset cancellation device according to the present invention.

FIG. 2a shows a basic structure of a DC offset cancellation device according to the present invention. As shown in the drawing, the DC offset cancellation device 20 comprises a direct down conversion receiving module 21, an offset compensation module 22, a high pass module 23 and a control module 24.

The direct down conversion receiving module 21 receives an analog radio frequency signal and converts the analog radio frequency signal to a digital baseband signal. The offset compensation module 22 detects DC offset value during the conversion and provides an offset compensation signal corresponding to the DC offset value to the direct down conversion receiving module 21. The high pass module 23 cancels DC offset in the direct down conversion receiving module 21. The control module 24 sets a control condition so as to switch the state of the high pass module 23 according to the control condition.

Figure 2B:
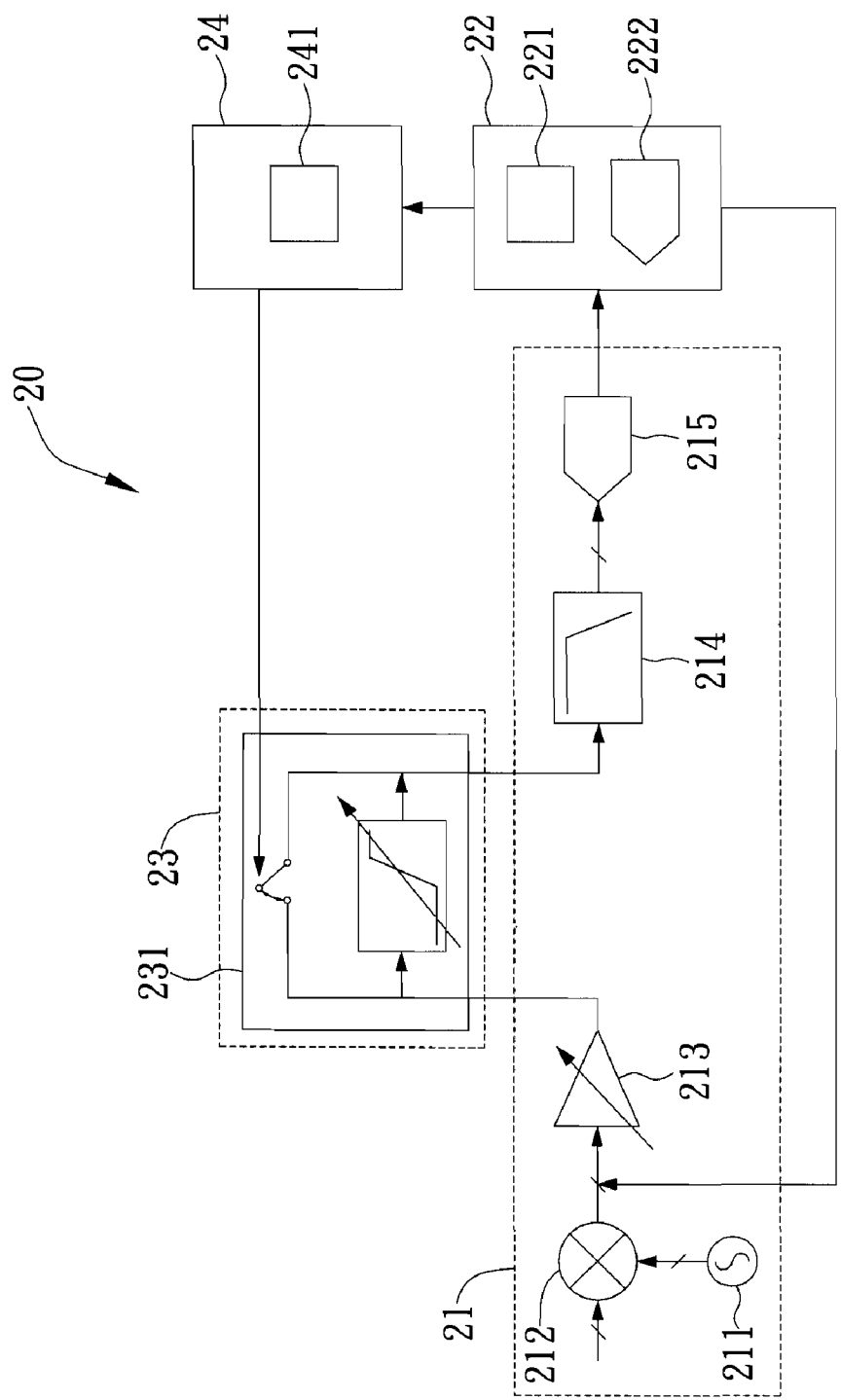
FIG. 2b is a diagram showing structure of a DC offset cancellation device according to a first embodiment of the present invention.
Figure 2C:
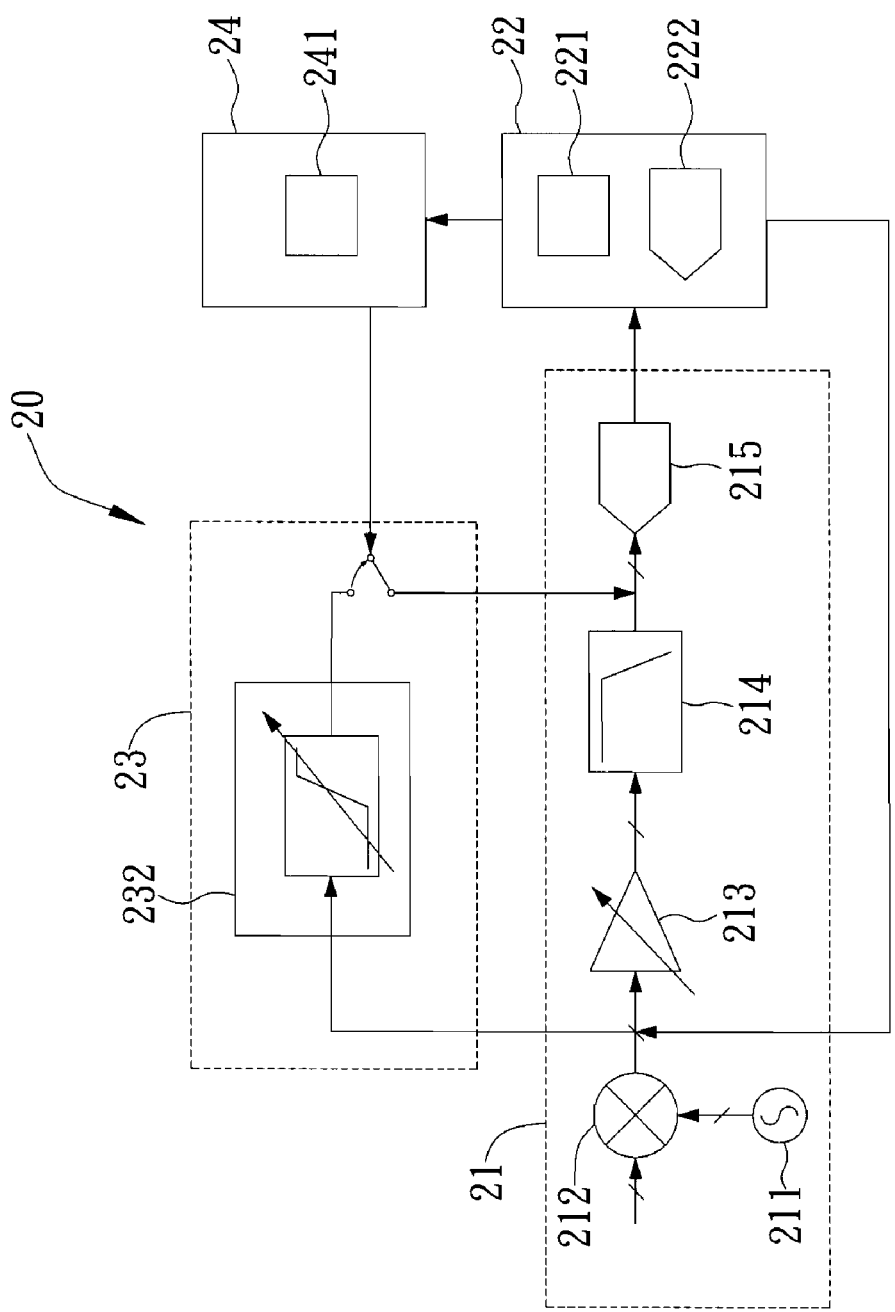
FIG. 2c is a diagram showing structure of a DC offset cancellation device according to a second embodiment of the present invention.

FIG. 2b shows the structure of a DC offset cancellation device according to a first embodiment of the present invention, and FIG. 2c shows the structure of a DC offset cancellation device according to a second embodiment of the present invention. As shown in FIGS. 2b and 2c, the direct down conversion receiving modules 21 further comprise a local oscillation signal source 211, a mixing unit 212, an amplifying unit 213, a filtering unit 214 and an analog-to-digital conversion unit 215.

The mixing unit 212 receives and mixes the analog radio frequency signal and a local oscillation signal provided by the local oscillation signal source 211 to produce a baseband signal. The amplifying unit 213 receives the baseband signal to produce an amplified baseband signal. The filtering unit 214 receives the amplified baseband signal to produce a filtered baseband signal. The analog-to-digital conversion unit 215 converts the filtered baseband signal to a digital baseband signal.

Figure 2D:
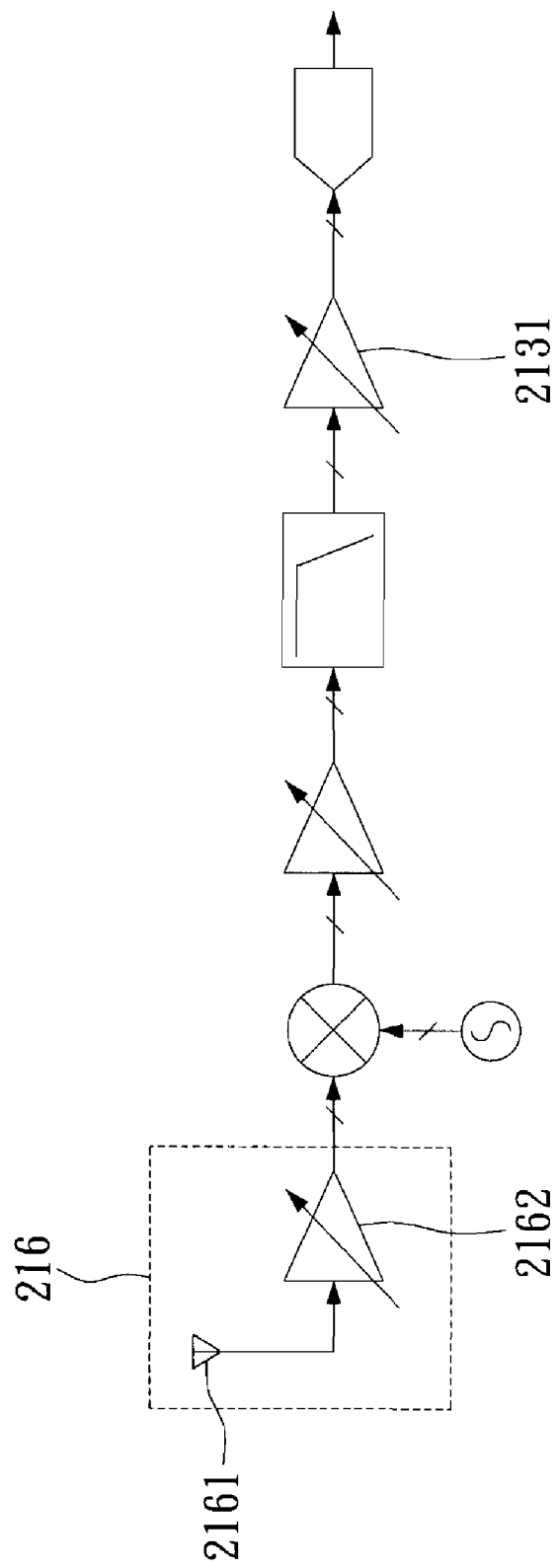
FIG. 2d is a diagram showing application structure of a DC offset cancellation device.

Further referring to FIG. 2d, preferably, the direct down conversion receiving module 21 further comprises a post stage amplifying unit 2131 which receives the filtered baseband signal and amplifies the filtered baseband signal to a desired strength. The post stage amplifying unit 2131 can also receive an offset compensation signal to cancel DC offset.

The DC offset cancellation device 20 further comprises a radio frequency signal receiving module 216 with a receiving antenna 2161 for receiving a wireless radio frequency signal and converts the wireless radio frequency signal to an analog radio frequency signal. Further, since signal power often decreases when the filtering unit produces a filtered baseband signal, preferably, the radio frequency signal receiving module 216 comprises a pre stage amplifier 2162 for amplifying the analog radio frequency signal to a desired strength. But it should be noted that the DC offset cancellation device of the present invention is not limited to FIG. 2d.

Referring back to FIGS. 2b and 2c, the offset compensation module 22 further comprises an offset compensation data unit 221 for storing and providing a plurality of groups of offset compensation signal data, wherein when the offset compensation module 22 detects a DC offset value, it compares the DC offset value with the plurality of groups of offset compensation signal data so as to select a group of offset compensation signals corresponding to the DC offset value and provide the selected offset compensation signal to the amplifying unit 213 of the direct down conversion receiving module 21, thereby providing preliminary compensation to the direct down conversion receiving module 21 for rapidly decreasing the DC offset error.

It should be noted that the offset compensation signal produced by the offset compensation module 22 are generally digital offset compensation signal while the signal of the direct down conversion receiving module 21 is generally analog signal. Therefore, preferably the offset compensation module 22 further comprises a digital-to-analog conversion unit 222 for converting the digital offset compensation signal to an analog offset compensation signal which is further provided to the direct down conversion receiving module 21 for offset compensation. In other embodiments, the offset compensation module 22 can produce an analog offset compensation signal that is directly provided to the direct down conversion receiving module 21 for offset compensation.

Further, the high pass module 23 can have different structures as shown in FIGS. 2b and 2c. As shown in FIG. 2b, the high pass module 231 is connected between the mixing unit 212 and the amplifying unit 213 in series. Alternatively, as shown in FIG. 2c, the high pass module is a loop type high pass module 232.

Therein, as shown in FIG. 2b, when the series-connected high pass module 231 is off, the signal from the mixing unit 212 is, e.g. directly, transmitted to the amplifying unit 213 without passing through the high pass module 231. On the other hand, when the high pass module 231 is on, the signal from the mixing unit 212 passes through the high pass module 231 for canceling the DC offset error in the signal before being transmitted to the amplifying unit 213.

As shown in FIG. 2c, when the loop type high pass module 232 is off, it does not produce a feedback signal. On the other hand, when the loop type high pass module 232 is on, it produces a feedback signal to compensate the amplifying unit 213, thereby canceling the DC offset error in the signal.

Further, the high pass module 23 can be a variable high pass module with its corner frequency variable between higher high pass frequency and lower high pass frequency. In order to reduce the reaction time for entire DC filtering, the high pass module 23 switches to a higher high pass frequency to filter most of DC offset within short time at the expense of some signal bandwidth and then switches to a lower high pass frequency for filtering the residual DC offset.

Furthermore, the control module 24 determines the state of the high pass module 23. In principle, the type of the control condition set by the control module 24 for determining the state of the high pass module 23 can be arbitrarily selected.

However, time is an important parameter in the wireless radio frequency system. Therefore, in a preferred embodiment, switching period is used as the control condition. More preferably, the control module 24 comprises a time unit 241 for setting and calculating the switching period so as to determine the time point for switching the state of the high pass module 23.

For example, in the case the operation time of the preamble process is determined, ¾ of the operation time of the preamble process is used as the control condition of the control module 24. In other words, when the offset compensation module 22 has made preliminary compensation to the direct down conversion receiving module 21 for ¾ of the operation time of the preamble process, the control module 24 switches on the high pass module 23 such that the high pass module 23 can cancel the residual DC offset after the preliminary compensation.

In combination with the above-disclosed DC offset cancellation device, the present invention further provides a DC offset cancellation method.

Figure 3A:
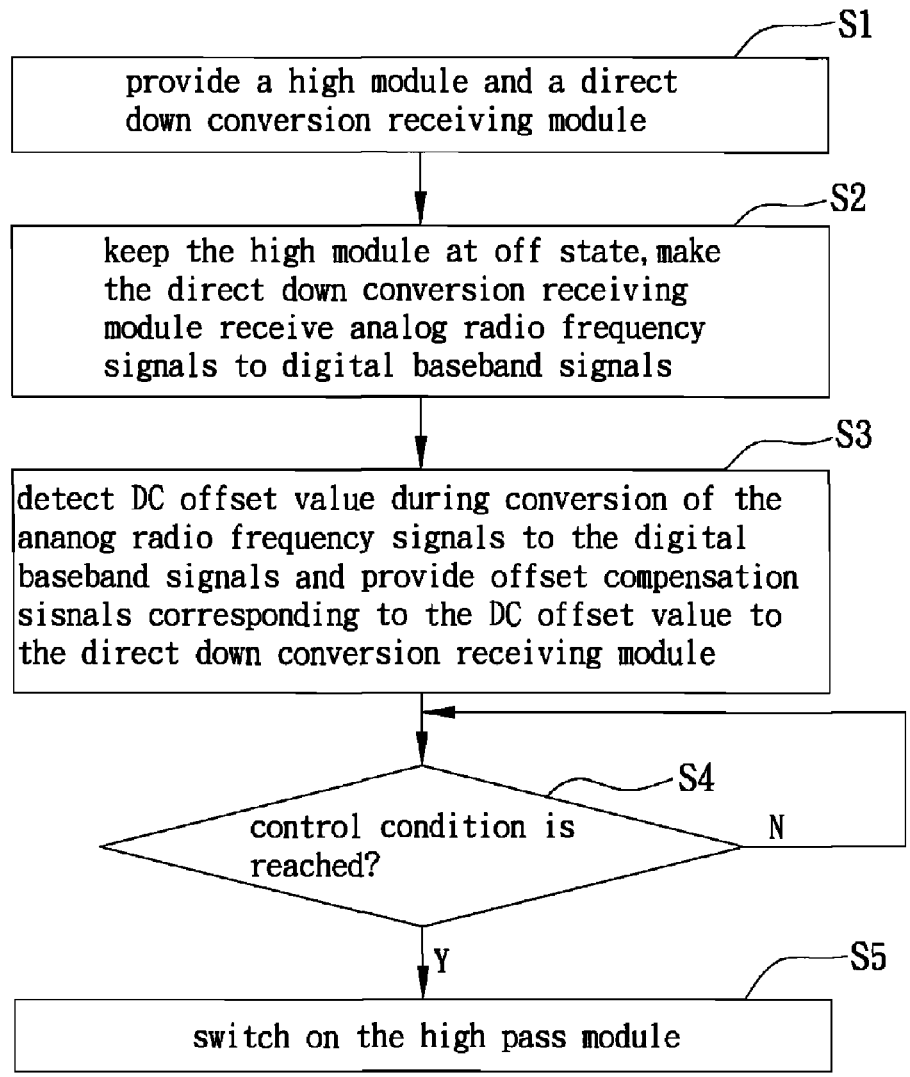
FIG. 3a is a flow diagram showing a DC offset cancellation method according to the present invention.

FIG. 3a shows a DC offset cancellation method of the present invention. As shown in the drawing, at step S1, a high pass module and a direct down conversion receiving module are provided, wherein the high pass module can be switched on or off. Preferably, the high pass module and the direct down conversion receiving module are disposed as described in the DC offset cancellation device of the present invention. Then, the process goes to step S2.

At step S2, the high pass module is kept at off state, and the direct down conversion receiving module receives an analog radio frequency signal and converts the analog radio frequency signal to a digital baseband signal. Then, the process goes to step S3.

At step S3, DC offset value is detected during the conversion of the analog radio frequency signal to the digital baseband signal, and an offset compensation signal corresponding to the DC offset value is provided to the down conversion receiving module. Then, the process goes to step S4.

At step S4, determine whether a control condition is reached, if yes, the process goes to step S5, otherwise, the high pass module is kept at off state and step S4 is repeated.

At step S5, the high pass module is switched on.

In a preferred embodiment, a switching period is used as the control condition and accordingly step S4 determines whether the switching period is reached. Therefore, step S3 further comprises specifying staring point of the switching period and accumulating the switching period. Accordingly, step S4 comprises determining whether the switching period is reached, if yes, the process goes to step S5 for switching on the high pass module, otherwise, the high pass module is kept at off state and step S4 is repeated.

Figure 3B:
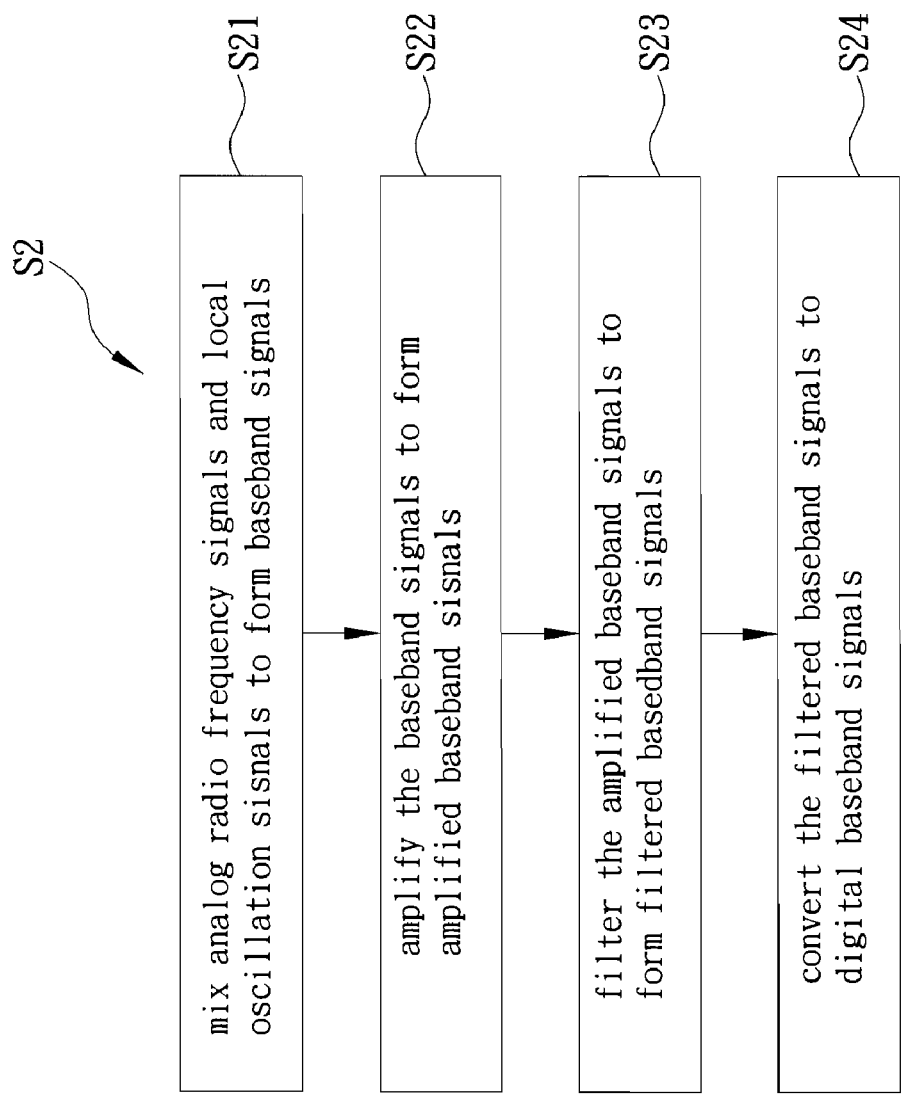
FIG. 3b is a flow diagram showing detailed process steps of step S2 of the DC offset cancellation method according to the present invention.

FIG. 3b shows detailed process steps of step S2 of the DC offset cancellation method of the present invention. As shown in the drawing, step S2 further comprises the following steps.

At step S21, the analog radio frequency signal and a local oscillation signal are mixed to form a baseband signal.

At step S22, the baseband signal is amplified to form an amplified baseband signal.

At step S23, the amplified baseband signal is filtered to form a filtered baseband signal.

At step S24, the filtered baseband signal is converted to a digital baseband signal.

Figure 3C:
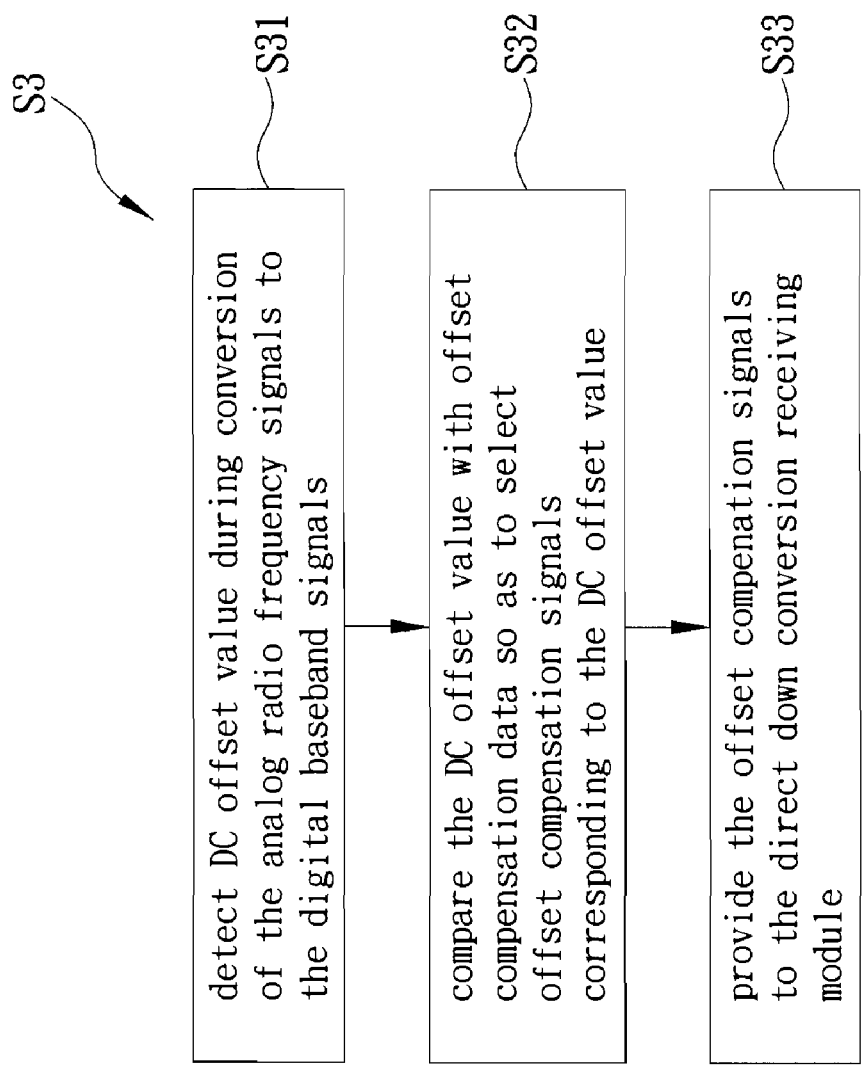
FIG. 3c is a flow diagram showing detailed process steps of step S3 of the DC offset cancellation method according to the present invention.

FIG. 3c shows the detailed process steps of step S3 of the DC offset cancellation method of the present invention. Preferably, step S3 further comprises the following steps. At step S31, DC offset value is detected during the conversion of the analog radio frequency signal to the digital baseband signal.

At step S32, the DC offset value is compared with offset compensation data such that an offset compensation signal corresponding to the DC offset value can be selected.

At step S33, the offset compensation signal is provided to the direct down conversion receiving module.

Figure 3D:
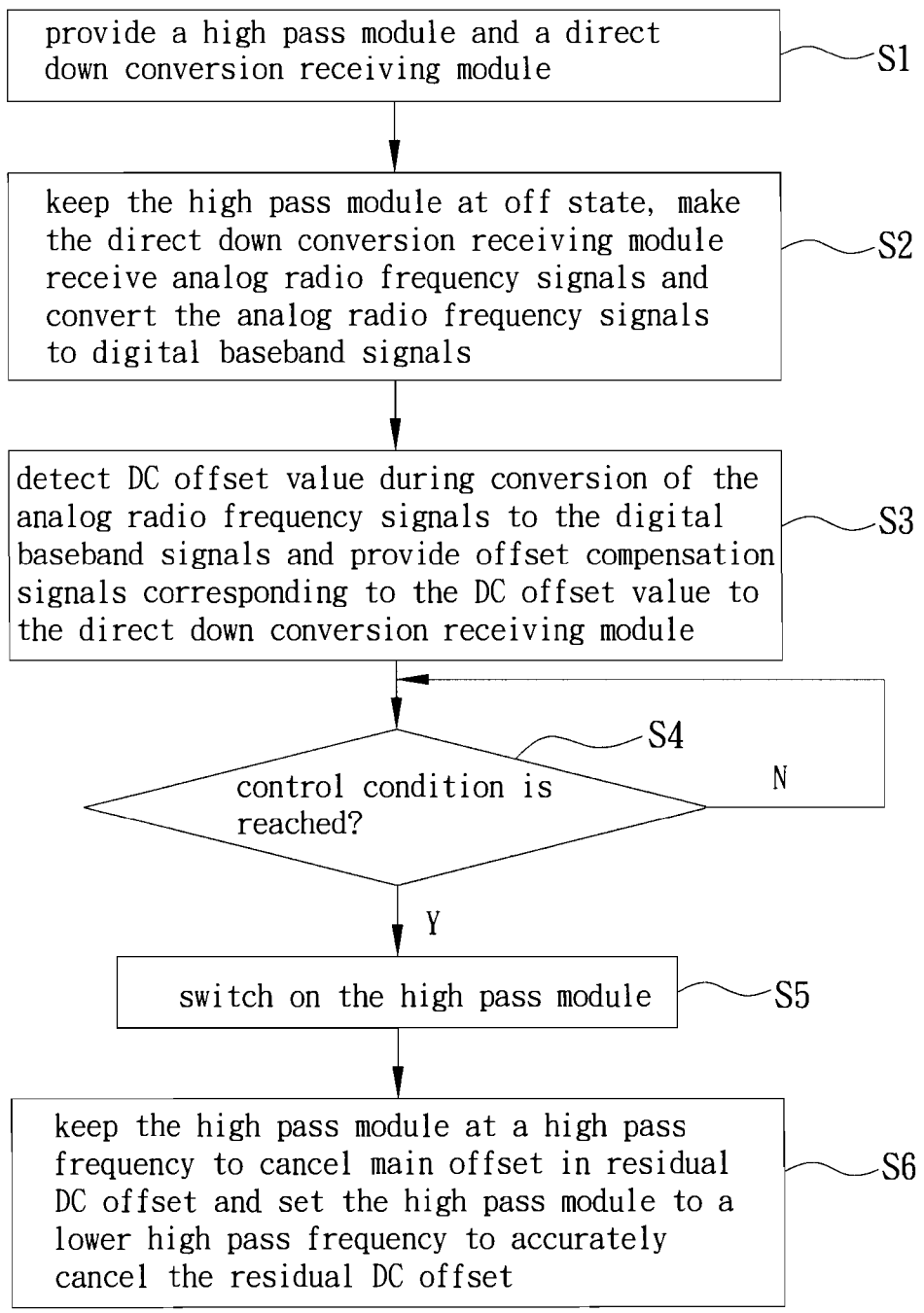
FIG. 3d is a flow diagram showing a DC offset cancellation method according to another embodiment of the present invention.

As shown in FIG. 3d, the DC offset cancellation method further comprises step S6, which is performed after step S5 in the case a variable high pass module is used. At step S6, the high pass module is kept at a higher high pass frequency to cancel main offset in residual DC offset, and then the high pass module is set to a lower high pass frequency to cancel the residual DC offset.

Therefore, the present invention keeps the high pass module at off state and converts analog radio frequency signal to digital baseband signal through the direct down conversion receiving module, and then detects DC offset value during the conversion process through the offset compensation module so as to provide an offset compensation signal corresponding to the DC offset value to the direct down conversion receiving module. Thereafter, the control module determines whether the control condition is reached so as to timely switch on the high pass module to cancel the residual DC offset error in the direct down conversion receiving module.

Therefore, the present invention provides a preliminary compensation signal through an offset compensation module, and then accurately cancels the residual DC offset through the high pass module, thereby greatly reducing the reaction time in the DC offset cancellation without adversely affecting the degree of precision.

The above-described descriptions of the detailed embodiments are only to illustrate the preferred implementation according to the present invention, and it is not to limit the scope of the present invention. Accordingly, all modifications and variations completed by those with ordinary skill in the art should fall within the scope of present invention defined by the appended claims.

What is claimed is:

1. A DC offset cancellation device, comprising:
a direct down conversion receiving module for receiving an analog radio frequency signal and converting the analog radio frequency signal to a digital baseband signal;
an offset compensation module for detecting a DC offset value during the conversion of the analog radio frequency signal to the digital baseband signal and providing an offset compensation signal corresponding to the DC offset value to the direct down conversion receiving module;
a high pass module for canceling the DC offset in the direct down conversion receiving module; and
a control module for setting a control condition and switching the state of the high pass module according to the control condition,
wherein the control module determines whether the control condition is reached, if yes, the high pass module is switched on, otherwise, the high pass module is kept at off state.

2. The device of claim 1, wherein the direct down conversion receiving module further comprises a local oscillation signal source, a mixing unit, an amplifying unit, a filtering unit and an analog-to-digital conversion unit, and the mixing unit receives and mixes the analog radio frequency signal and a local oscillation signal from the local oscillation signal source to produce a baseband signal.

3. The device of claim 2, wherein when the high pass module is off, a signal from the mixing unit is transmitted to the amplifying unit without passing through the high pass module.

4. The device of claim 2, wherein when the high pass module is on, a signal from the mixing unit passes through the high pass module before transmitted to the amplifying unit.

5. The device of claim 2, wherein the high pass module is a loop type high pass module which produces a feedback signal to compensate the amplifying unit.

6. The device of claim 1, wherein the direct down conversion receiving module further comprises a post stage amplifying unit for amplifying a filtered baseband signals.

7. The device of claim 1, further comprising a radio frequency signal receiving module for receiving a wireless radio frequency signal and converting the wireless radio frequency signal to the analog radio frequency signal.

8. The device of claim 7, wherein the radio frequency signal receiving module further comprises a receiving antenna for receiving the wireless radio frequency signal.

9. The device of claim 7, wherein the radio frequency signal receiving module further comprises a pre stage amplifier for amplifying the analog radio frequency signal.

10. The device of claim 1, wherein the offset compensation module further comprises an offset compensation data unit for storing and providing a plurality of groups of offset compensation signal data.

11. The device of claim 10, wherein the offset compensation module compares the DC offset value and the plurality of groups of offset compensation signal data so as to produce an offset compensation signal corresponding to the DC offset value and provide the offset compensation signal to the direct down conversion receiving module.

12. The device of claim 1, wherein the offset compensation module further comprises a digital-to-analog conversion unit for converting the digital offset compensation signal to an analog offset compensation signal.

13. The device of claim 1, wherein the high pass module is a variable high pass module with a variable corner frequency between a higher high pass frequency and a lower high pass frequency.

14. The device of claim 1, wherein the control module further comprises a time unit for calculating a switching period and a switching time point.

15. A DC offset cancellation method, comprising the steps of:
receiving an analog radio frequency signal, converting the analog radio frequency signal to a digital baseband signal and keeping a high pass module at off state;
detecting a DC offset value during the conversion of the analog radio frequency signal to the digital baseband signal and providing a offset compensation signal corresponding to the DC offset value; and determining whether a control condition is reached, if yes, the high pass module is switched on, otherwise, the high pass module is kept at off state.

16. The method of claim 15, wherein the step of receiving the analog radio frequency signal further comprises the steps of:
   mixing the analog radio frequency signal and a local oscillation signal to form the baseband signal;
   amplifying the baseband signal to form an amplified baseband signal;
   filtering the amplified baseband signal to form a filtered baseband signal; and
   converting the filtered baseband signal to the digital baseband signal.

17. The method of claim 15, further comprising the step of amplifying the analog radio frequency signal.

18. The method of claim 15, wherein the step of detecting the DC offset value comprises the steps of:
   detecting a DC offset value during the conversion of the analog radio frequency signal to the digital baseband signal;
   comparing the DC offset value with offset compensation data to select an offset compensation signal corresponding to the DC offset value; and
   providing the offset compensation signal to the direct down conversion receiving module.

19. The method of claim 15, wherein the step of detecting a DC offset value comprises the steps of:
   specifying a starting point of a switching period and accumulating time over the switching period; and
   determining whether the switching period is reached, if yes, the high pass module is switched on, otherwise the high pass module is kept at off status.

20. The method of claim 15, further comprising the steps of:
   keeping the high pass module at a higher high pass frequency so as to cancel a main offset in residual DC offset, and
   setting the high pass module to a lower high pass frequency so as to further cancel the residual DC offset.

* * * * *